United States Patent [19]
Beuzeville

[11] Patent Number: 5,828,504
[45] Date of Patent: Oct. 27, 1998

[54] EXTERIOR REARVIEW MIRROR FOR A VEHICLE

[75] Inventor: Xavier Beuzeville, Chatelet en Brie, France

[73] Assignee: Britax (Geco) S.A., France

[21] Appl. No.: 560,045

[22] Filed: Nov. 17, 1995

[30] Foreign Application Priority Data

Nov. 26, 1994 [GB] United Kingdom .................... 9423938

[51] Int. Cl.⁶ .............................. B60R 1/06; G02B 7/182
[52] U.S. Cl. ........................... 359/841; 359/872; 359/877
[58] Field of Search ................... 359/841, 872, 359/877

[56] References Cited

U.S. PATENT DOCUMENTS

| Re. 34,142 | 12/1992 | Fimeri . | |
|---|---|---|---|
| 4,363,534 | 12/1982 | Covert | 359/877 |
| 4,626,083 | 12/1986 | Nakayama et al. | 359/877 |
| 4,626,084 | 12/1986 | Kumai | 359/877 |
| 4,728,181 | 3/1988 | Kakinuma . | |
| 4,786,156 | 11/1988 | Kotani et al. | 359/872 |
| 4,982,926 | 1/1991 | Mori et al. . | |
| 5,088,679 | 2/1992 | Ogasawara . | |
| 5,432,640 | 7/1995 | Gilbert et al. | 359/841 |

FOREIGN PATENT DOCUMENTS

| 0272047 | 6/1988 | European Pat. Off. . |
|---|---|---|
| 0146888 | 3/1989 | European Pat. Off. . |
| 0 367 134 | 5/1990 | European Pat. Off. . |
| 0 405 773 A1 | 1/1991 | European Pat. Off. . |
| 0255150B1 | 4/1992 | European Pat. Off. . |
| 3820578A1 | 2/1989 | Germany . |
| 4030010A1 | 4/1991 | Germany . |
| 41 08 273 A1 | 9/1991 | Germany . |
| 60-148736 | 8/1985 | Japan . |
| 60-148737 | 8/1985 | Japan . |
| 61-222841 | 10/1986 | Japan .................... 359/877 |
| 62-131843 | 6/1987 | Japan . |
| 136347 | 5/1990 | Japan .................... 359/877 |
| 404038237 | 2/1992 | Japan .................... 359/877 |
| 404345549 | 12/1992 | Japan .................... 359/877 |
| 2 237 252 | 5/1991 | United Kingdom . |
| 2237252 | 3/1993 | United Kingdom . |

OTHER PUBLICATIONS

Excerpt from Patent Abstracts of Japan, vol. 9, No. 313 (M–437), Dec. 10, 1985, & JP–A–60 148735, Aug. 6, 1985.
Excerpt from Patent Abstracts of Japan, vol. 11, No. 352 (M–643), Nov. 18, 1987, & JP–A–62 131843, Jun. 15, 1987.
Excerpt from Patent Abstracts of Japan, vol. 10, No. 299 (M–524), Oct. 11, 1986, & JP–A–61 110639, May 28, 1986.

*Primary Examiner*—Ricky D. Shafer
*Attorney, Agent, or Firm*—Harness, Dickey & Pierce, P.L.C.

[57] ABSTRACT

An exterior rearview mirror for a vehicle comprises a base member (10) adapted to be secured to a vehicle body, and a mirror head (56, 78, 82) mounted on the base member (10) for angular movement about a substantially vertical axis between a position of normal use and a position folded alongside the motor vehicle body. A detent (102) is adapted to hold the mirror head (56, 78, 82) in its normal position, an electric motor (142). A cam powered by the electric motor (142) is arranged to cause movement of the detent (102) out of engagement during an initial phase of movement and to cause angular movement of the mirror head (56, 78, 82) away from its normal position during a subsequent phase of movement.

17 Claims, 9 Drawing Sheets

EXTERIOR REARVIEW MIRROR FOR A VEHICLE

This invention relates to an exterior rearview mirror for a vehicle comprising a base member adapted to be secured to a vehicle body, a mirror head mounted on the base member for angular movement about a substantially vertical axis between a position of normal use and a position folded alongside the motor vehicle body, detent means adapted to hold the mirror head in its normal position, an electric motor, and transmission means powered by the electric motor and operative to move the mirror head between its normal position and its folded-back position.

RELATED ART

An exterior rearview mirror of this type is disclosed in GB-A-2237252. The transmission means is arranged to move the housing away from its normal position against the action of the detent means. Consequently, the force necessary to cause initial movement of the housing is substantially greater than that required for subsequent movement, with the result that the electric motor has a relatively high starting load. It is an object of the invention to provide an exterior mirror of the type described above which is not subject to this disadvantage.

SUMMARY OF THE INVENTION

According to the invention, the transmission means is arranged to cause movement of the detent means out of engagement during an initial phase of movement and to cause angular movement of the housing away from its normal position during a subsequent phase of movement.

BRIEF DESCRIPTION OF THE DRAWINGS

Embodiments of the invention will now be described, by way of example, with reference to the accompanying drawings, in which.

DETAILED DESCRIPTION OF THE PREFERRED EMBODIMENT

Figure 1:
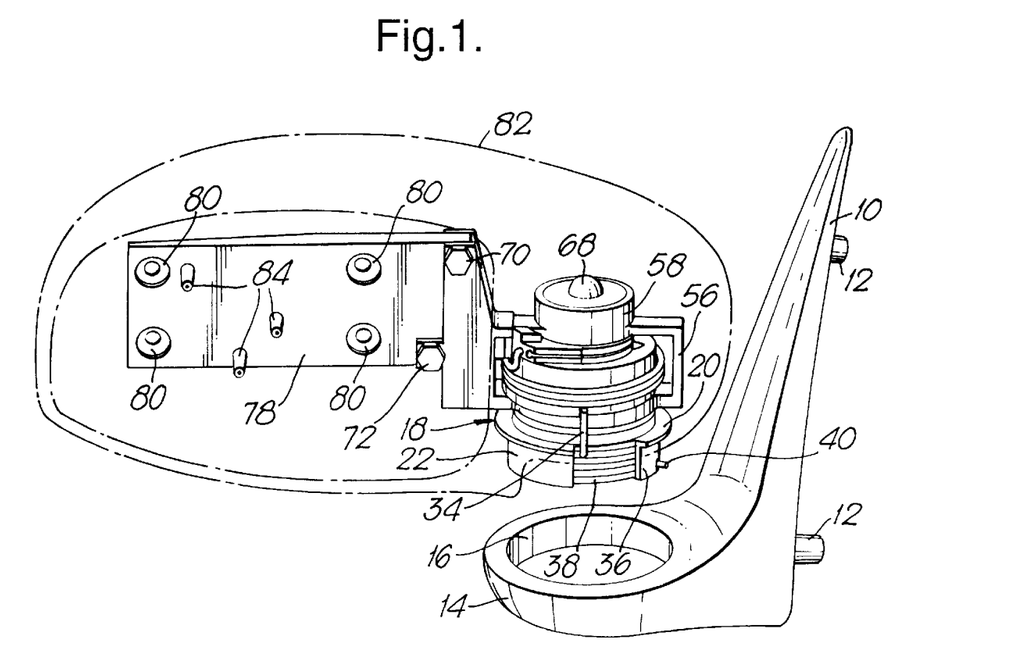
FIG. 1 is a partly exploded perspective view of a rearview mirror in accordance with a first embodiment of the invention.
Figure 2:
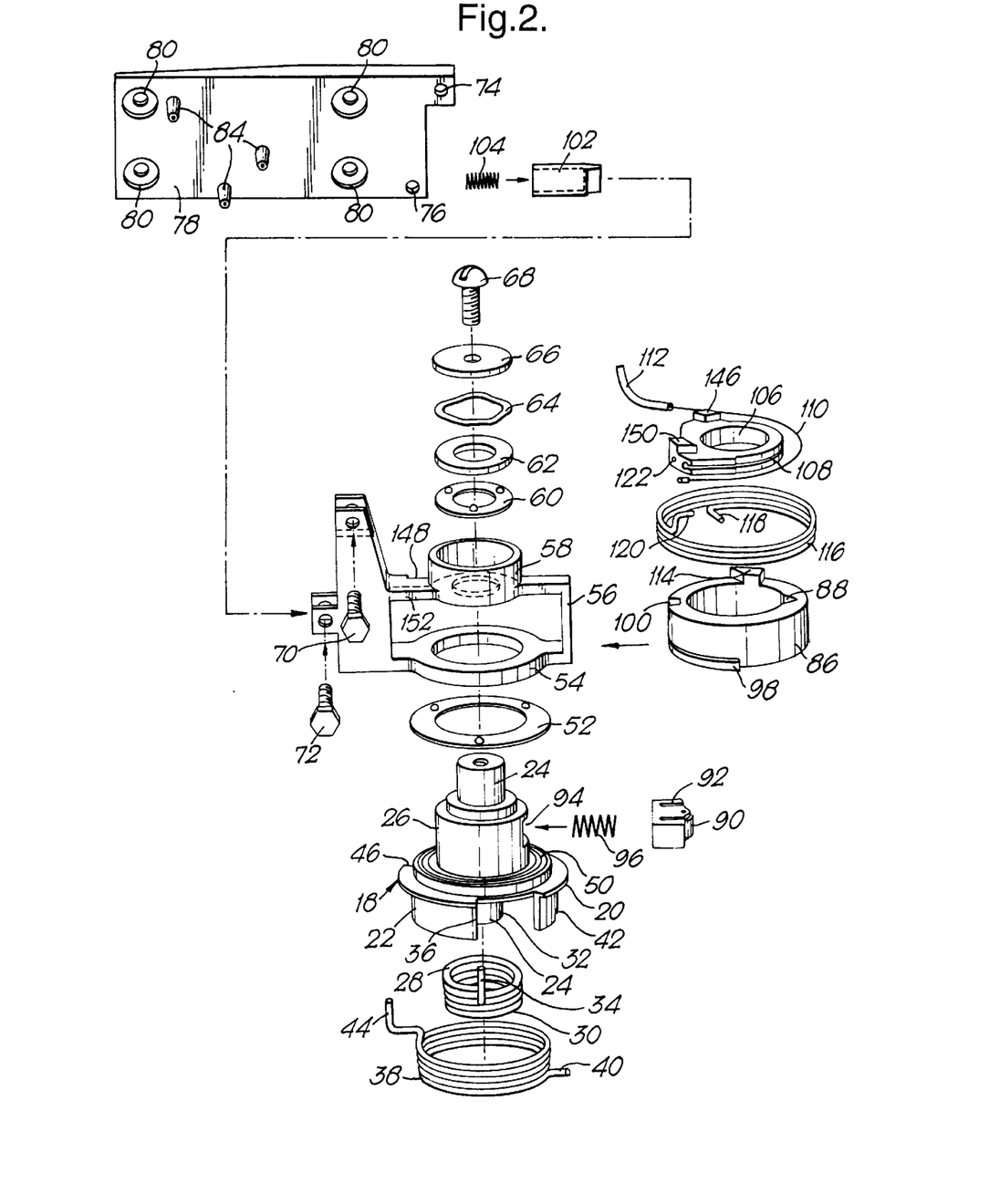
FIG. 2 is an exploded perspective view of the embodiment shown in FIG. 1.

Referring to FIGS. 1 and 2, an exterior rearview mirror has a base member 10 with laterally projecting studs 12 by which it can be mounted on a door of a motor vehicle. A horizontal platform 14 projects from the opposite side of the base member 10 and has an opening 16 for receiving a static bearing member 18. The bearing member 18 has a flange 20 which rests on the upper surface of the platform 14 and a downwardly extending cylindrical skirt 22 which extends into the opening 16. The bearing member 18 also has a central stem 24 which has an enlarged diameter portion 26 immediately above the flange 18 and which also projects downwardly within the skirt 22.

A forward return spring 28 surrounds the lower end of the stem 24 with a radially inwardly directed leg 30 at its lower end engaging in a notch 32 in the bottom of the stem 24 and an upwardly projecting leg 34 on its other end extending through a window 36 in the skirt 22 and flange 20. A rearward return spring 38 is located between the forward return spring 28 and the skirt 22 and has a radially outwardly extending leg 40 on its lower end which engages in a notch 42 in the skirt 22. At its other end, the spring 38 has an upwardly extending leg 44 which projects through a second window 46 in the flange 20. The functions of the forward return spring 28 and the rearward return spring 38 will be described hereinafter with reference to FIGS. 12 to 15.

A bottom ball race 50 surrounds the enlarged diameter portion 26 of the stem 24 and rests on the flange 20. The ball race 50 receives ball bearings which are supported by a ball guide 52 and engaged in an upper ball race 54 which is formed integrally with a pivoting cage 56. The upper part of the cage 56 includes a cylindrical portion 58 which contains a lower ball race for receiving ball bearings supported in a second ball guide 60 which are engaged by an upper ball race 62. A spring washer 64 engages between the upper ball race 62 and a first washer 66 which is secured to the top of the stem 24 by a screw 68.

Two bolts 70 and 72 extend through respective holes 74, 76 in a mirror base plate 78 to secure it to the pivoting cage 56. The mirror base plate 78 has four holes 80 for receiving screws (not shown) whereby it may be secured to the interior of a mirror housing 82 (shown in chain-dotted lines in FIG. 1). The mirror base plate 78 also has three pillars 84 on which may be mounted remotely operable means for varying the orientation of a reflective member (not shown) relative to the mirror base plate 78. The remote control means can be of known design, for example as described in EP-A-0272047. The pivoting cage 56, base plate 78, housing 82, reflective member and remote control means together comprise a mirror head.

Within the pivoting cage 56, an intermediate member, in the form of indexing drum 86, is journaled on the enlarged diameter portion 26 of the stem 24. On its inner periphery, the indexing drum 86 has a V-shaped notch 88 which is engaged by an indexing roller 90 carried by a slider 92 which is received in a pocket 94 in the enlarged diameter portion 26 of the stem 24 and biassed outwardly by a compression spring 96 which is arranged to exert sufficient force hold the indexing roller 90 securely in the notch 88 under normal conditions of use. On its outer periphery, the indexing drum 86 has an abutment 98 which is engaged by the upwardly extending leg 34 of the forward return spring 28. The indexing drum 86 also has a notch 100 for engagement by the lower part of an indexing bolt 102 which is slidably mounted in a pocket 103 (FIG. 4) in the pivoting cage 56 radially inwardly of the bolt 72. A compression spring 104 engages between the bolt 102 and the adjacent edge of the mirror base plate 78 so as to urge the bolt 102 into the notch 100. The bolt 102 has mutually parallel side edges so as not to be disengageable by application of a relative angular force between the pivoting cage 56 and the indexing drum 86. Consequently, the force required to be exerted by the spring 102 is much less than that exerted by the spring 96.

The upper edge of the inner end of the bolt 102 projects above the top surface of the indexing drum 86 and is engaged by an unlocking cam 106 which is journaled on the stem 24 below the upper part 58 of the pivoting cage 56. The unlocking cam 106 has a groove 108 in its outer periphery for receiving the wire 110 of a Bowden cable, the sheath 112 of which abuts against a projection 114 on the upper surface of the indexing drum 86. Thus, pulling on the wire 110 causes counter-clockwise movement of the indexing drum 86 (when viewed from the top). A return spring 116 has one end 118 engaging with the projection 114 on the indexing drum 86 and the other end 120 engaging in a hole 122 in the unlocking cam 106 so as to bias the latter in the clockwise direction.

Figure 3:
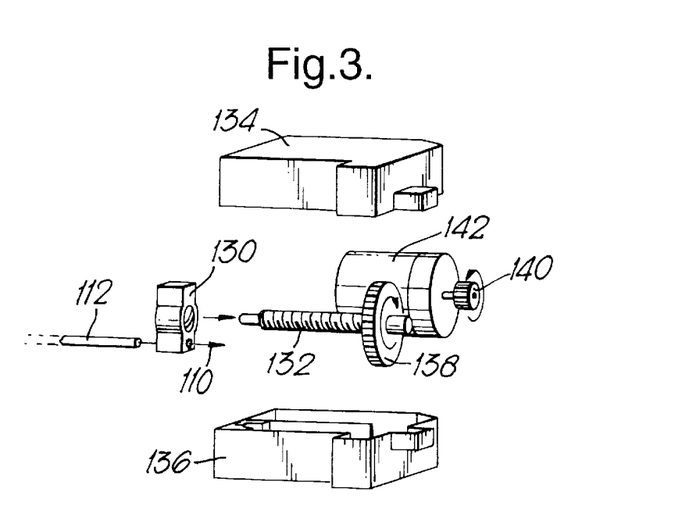
FIG. 3 is an exploded perspective view of an electric motor unit for use with the embodiment shown in FIGS. 1 and 2.

Referring to FIG. 3, the other end of the wire 110 is connected to a nut 130 which engages on a lead screw 132 which is journaled in a housing formed from upper and lower housing parts 134 and 136 and secured at some convenient location within the above mentioned mirror housing (not shown). The sheath 112 abuts against the lower housing part 136. The lead screw 132 carries a pinion 138 which is engaged by a smaller pinion 140 on the output shaft of an electric motor 142.

Figure 4:
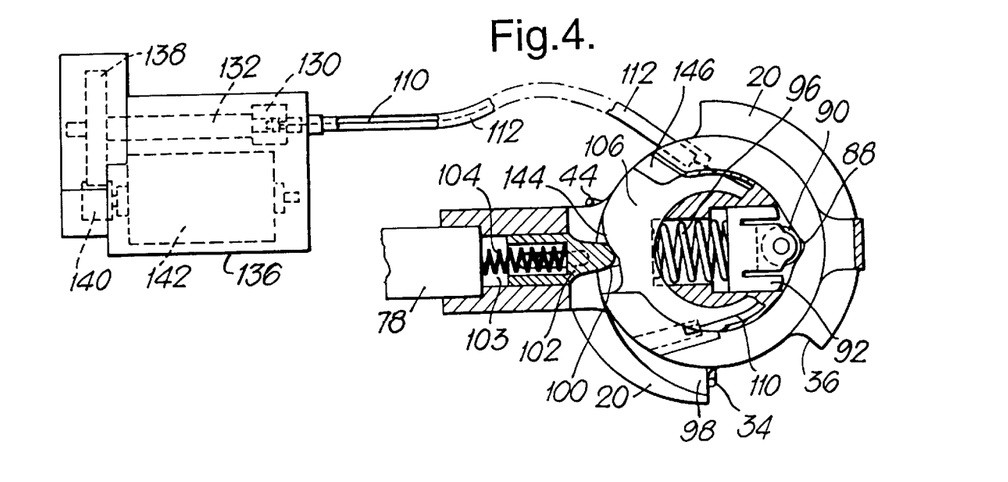
FIG. 4 is a schematic horizontal sectional view of the embodiment shown in FIGS. 1 to 3 with the housing in its normal position.
Figure 5:
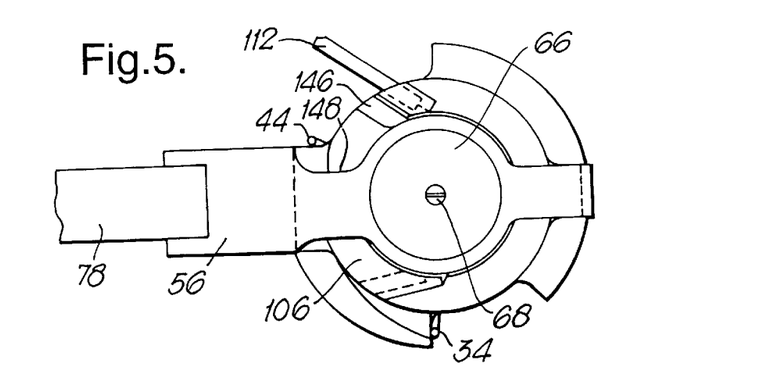
FIG. 5 is a plan view of the mechanism shown in FIG. 4.

FIGS. 4 and 5 show the assembly in its normal position. The roller 90 engages in the notch 88, holding the pivoting cage 56 in a fixed position relative to the base member 10. The bolt 102 engages in a notch 100, holding the pivoting cage 56, and with it the mirror base plate in a fixed position relative to the indexing drum 86. The nut 130 is at the right hand end of the lead screw 132.

Figure 6:
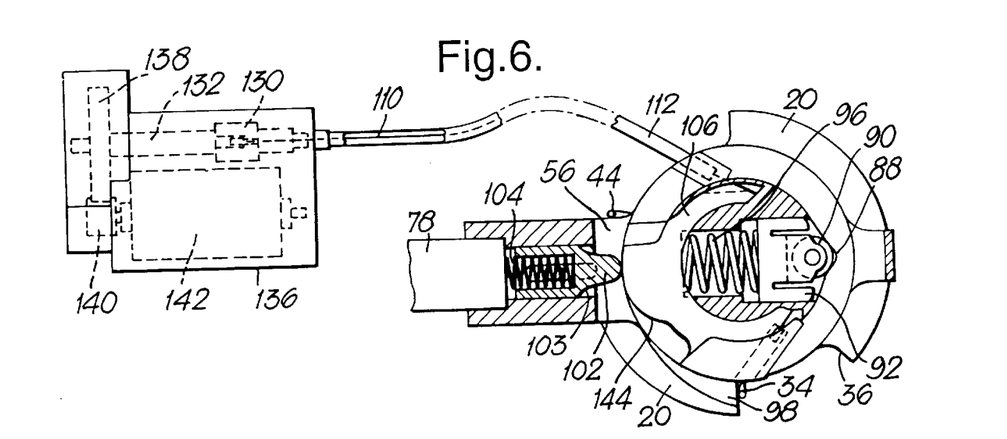
FIGS. 6 and 7 are views corresponding to FIGS. 4 and 5 but showing the mechanism after completion of an initial phase of the displacement of the housing from its normal position.
Figure 7:
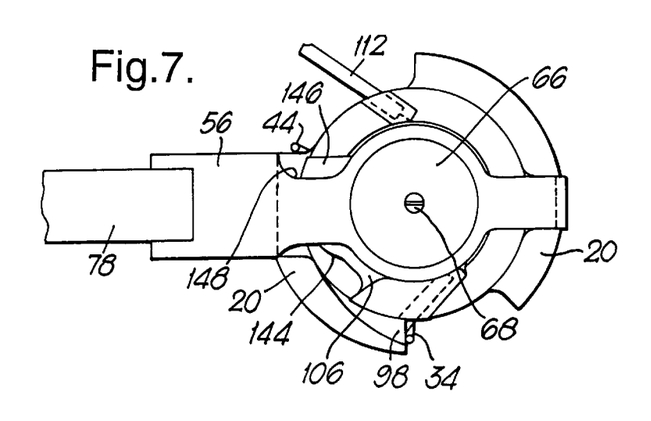
Figures 8, 9:
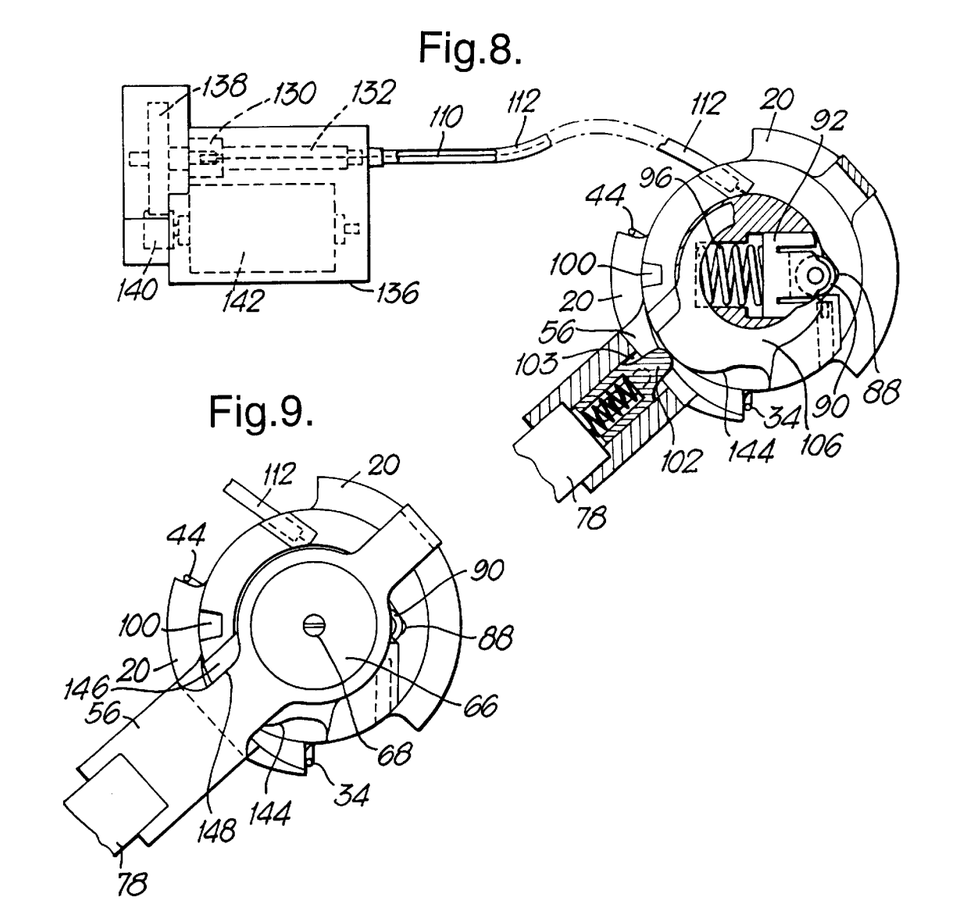
FIGS. 8 and 9 are views corresponding to FIGS. 4 and 5 but showing the mechanism with the housing displaced to its parking position.

When it is desired to fold the mirror rearwardly against the side of the vehicle, for example when parking in a confined space or when passing through a narrow gateway, the motor 142 is energised to move the nut 130 along the lead screw 132 to the position shown in FIG. 6. This causes angular movement of the unlocking cam 106 to the position shown in FIGS. 6 and 7, in which a cam surface 144 on the periphery thereof displaces the indexing bolt 102 out of the notch 100, thus freeing the pivoting cage 56 for angular movement relative to the indexing drum 86. At the same time, a first projection 146 on the top surface of the unlocking cam 106 comes into abutment with a first edge surface 148 on the pivoting cage 56 so that further rotation of the motor 142 causes the pivoting cage 56 to be moved in the counter-clockwise direction, as viewed from above, until it reaches the position shown in FIGS. 8 and 9. The nut 130 is now at the left hand end of the lead screw 132 and the pivoting cage 56 has moved rearwardly to a position in which the housing is folded back against the side of the vehicle.

Figures 10, 11, 12:
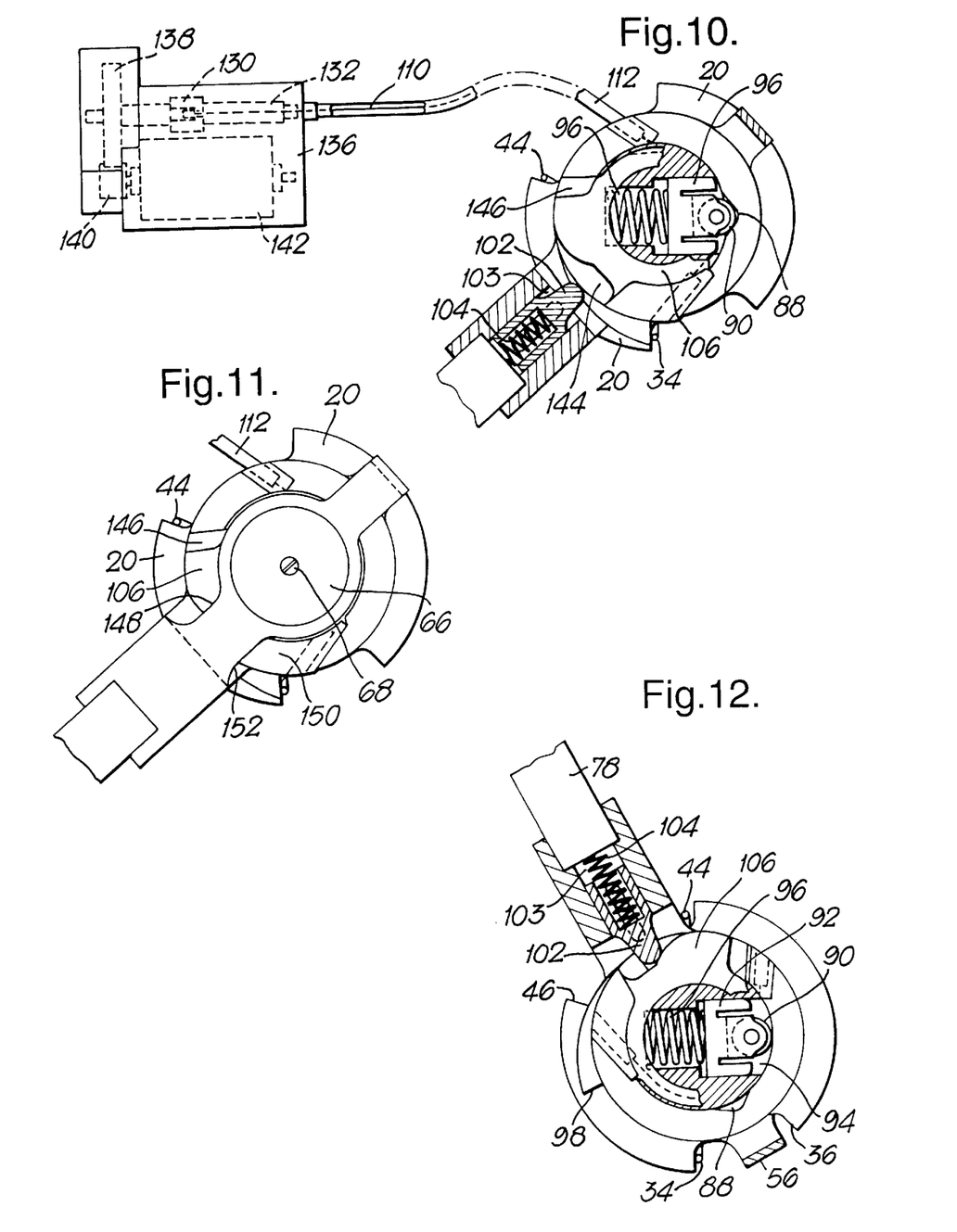
FIGS. 10 and 11 are views corresponding to FIGS. 4 and 5 but showing the mechanism after completion of an initial phase of movement restoring the housing to its normal position.
FIGS. 12 and 13 are views corresponding to FIGS. 4 and 5 but showing the housing forcibly displaced forwardly from its normal position.

When the mirror is to be restored to its normal position, the motor 142 is energised so as to rotate in the opposite direction, moving the nut 130 to the right along the lead screw 132, initially to the position illustrated in FIGS. 10 and 11. The indexing bolt 102 now rests on the outer cylindrical surface of the indexing drum 86. At the same time, a second projection 150 on the top surface of the unlocking cam 106 comes into abutment with a second edge surface 152 on the pivoting cage 56, so that further rotation of the motor 142 causes the pivoting cage 56 to be moved in the clockwise direction, as viewed from above, until it reaches its normal position shown in FIGS. 4 and 5, in which the indexing bolt 102 reengages in the notch 100 in the indexing drum 86. During all of these movements, the indexing roller 90 remains in engagement with the notch 88 in the indexing drum 86, holding the latter stationery with respect to the base member 10.

Figures 13, 14:
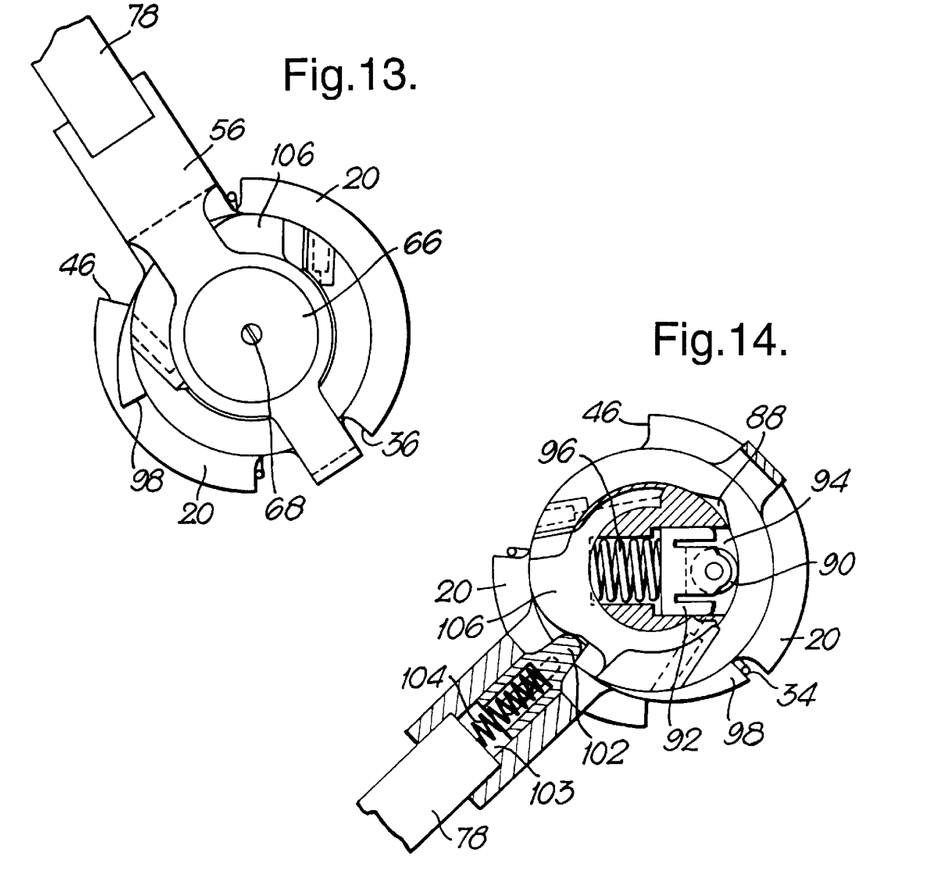
FIGS. 14 and 15 are views corresponding to FIGS. 4 and 5 but showing the housing forcibly displaced rearwardly from its normal position.

If the mirror housing is subject to impact or a similar force from the rear tending to displace it forwardly from its normal position, the indexing notch 102 remains engaged, holding the indexing drum 86 fast with the pivoting cage 56 and causing the indexing roller 90 to ride out of its notch 88 thereby allowing the pivoting cage 56 and the mirror base member 78 to move in the clockwise direction to the position illustrated in FIGS. 12 and 13. This movement is opposed by the rearward return spring 38, the upwardly extending leg 44 of which abuts against the front edge of the pivoting cage 56 outboard of the edge surface 148. When the force causing forward displacement of the mirror housing is removed, the rearward return spring 38 returns it to its normal position and the indexing roller 90 re-engages.

Figure 15:
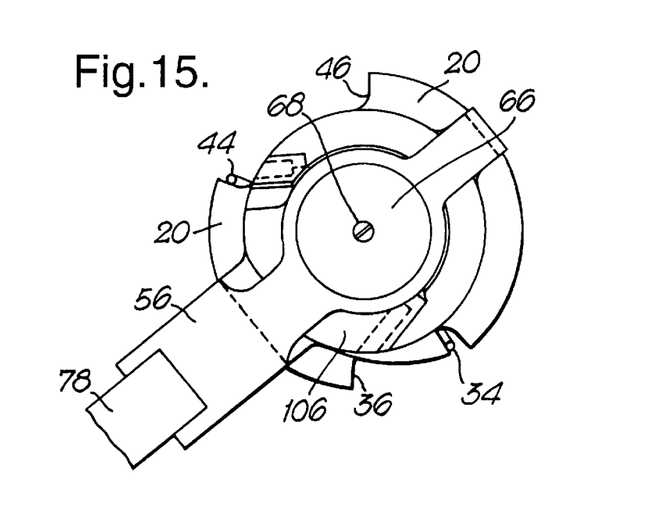
Figure 16:
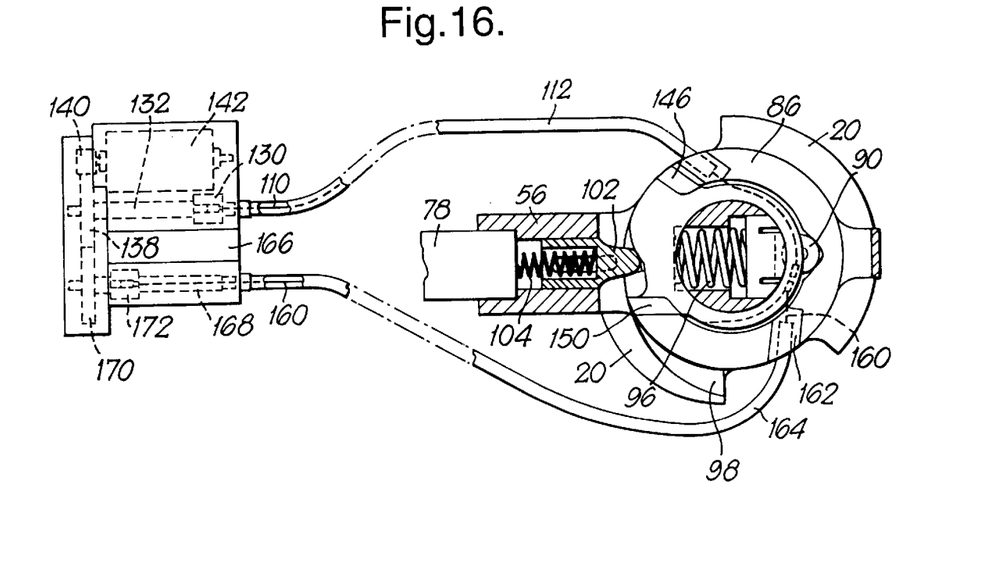
FIG. 16 is a horizontal sectional view, similar to FIG. 4, of the mechanism of a second embodiment of the invention with the housing in its normal position.
Figure 17:
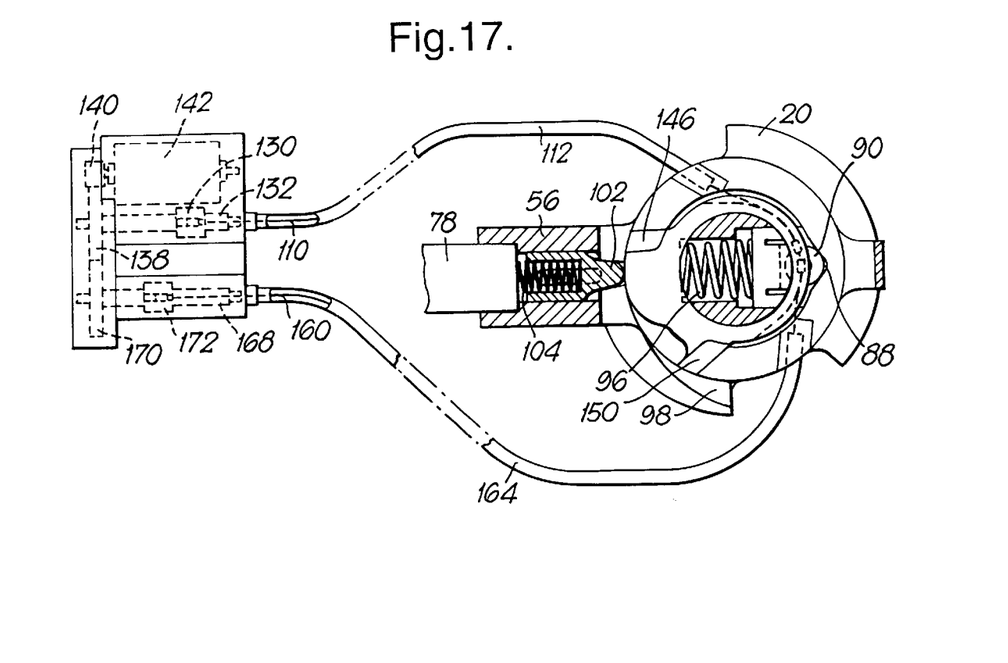
FIG. 17 is a horizontal sectional view, corresponding to FIG. 16 after completion of an initial phase of movement of the mechanism away from its normal position.
Figure 18:
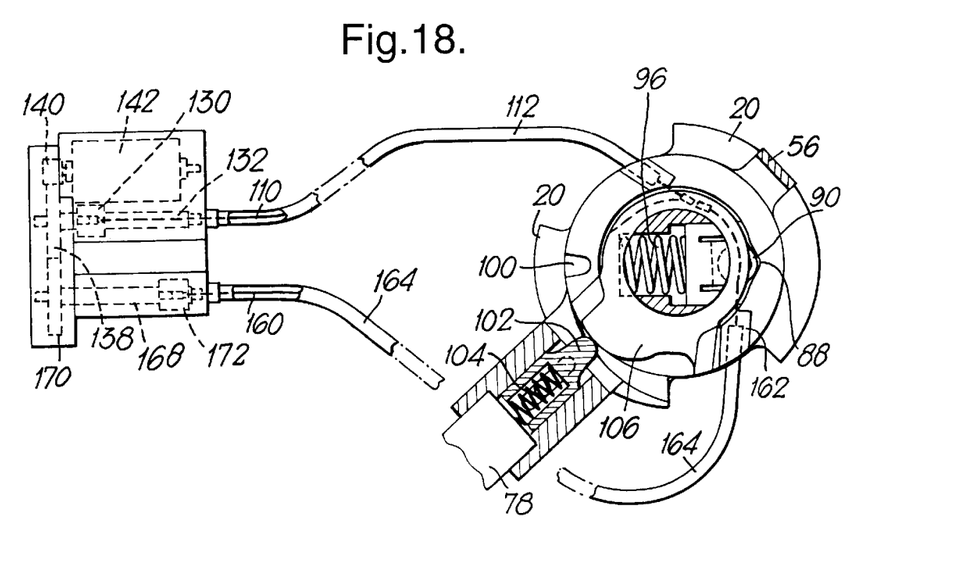
FIG. 18 is a view horizontal sectional corresponding to FIG. 16 but showing the mechanism in its parked position.

Similarly, as shown in FIGS. 14 and 15, when the mirror housing is subject to an impact or other force from the front tending to displace it rearwardly from its normal position, the indexing bolt 102 remains engaged and the indexing roller 90 is displaced out of its notch 88. This rearward movement of the pivoting cage 56 and the mirror base plate 78 is resisted by the forward return spring 28, the upwardly projecting leg 34 of which engages with the abutment on the indexing drum 86. When the force causing displacement is removed, the forward return spring 28 moves the pivoting cage 56 and, with it, the mirror housing back to its normal position.

Figure 19:
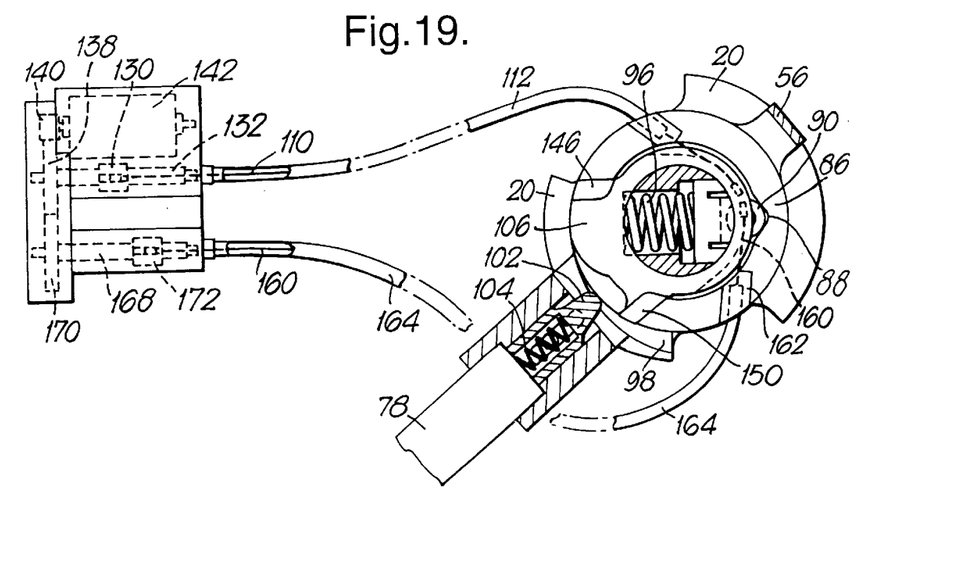
FIG. 19 is a view corresponding to FIG. 16 showing the mechanism after completion of an initial phase of movement for restoring the housing to its normal position.

FIGS. 16 to 19 illustrate a second embodiment of the invention, most of the components of which are identical with the corresponding components of FIGS. 1 to 15, are denoted by the same reference numerals and will not be described again in detail. The principal difference is that the return spring 116 for the unlocking cam 106 is replaced by a second flexible cable, one end of the wire 160 of which is attached to the unlocking cam 106 so as to pull in the opposite direction to the wire 110 of the first cable. The indexing drum 86 has an additional projection 162 against which the sheath 164 of the second cable abuts. The motor 142 is enclosed in an enlarged housing 166 which contains a second lead screw 168 carrying a pinion 170 which meshes with the pinion 138 so that the two lead screws 132 and 168 are driven in opposite directions. The second wire 160 is connected to a second nut 172 which engages with the second lead screw 168. The second embodiment operates to move the mirror base plate 78 in the mirror housing from its normal position to the position shown in FIG. 17 and then to the parking position shown in FIG. 18, in an identical manner to the first embodiment as described with reference to FIGS. 4 to 9. Operation during return to the normal position, through the position shown in FIG. 19, is identical to that of the first embodiment, except that the return movement of the unlocking cam 106 is caused by the wire 160 of the second cable rather than by the return spring 116.

Figure 20:
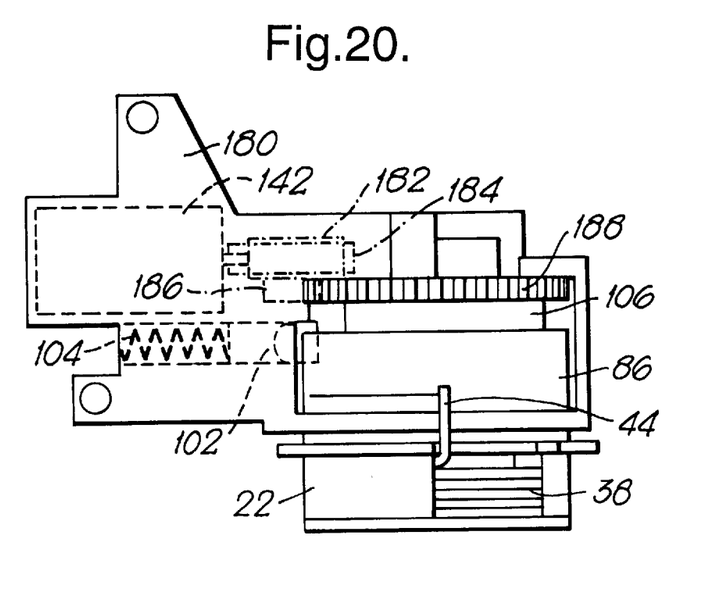
FIG. 20 is an elevation of part of the mechanism of a third embodiment of the invention.
Figure 21:
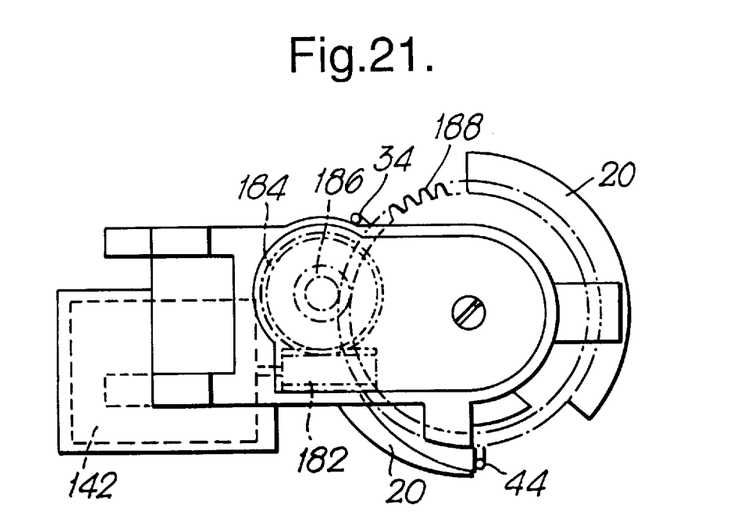
FIG. 21 is a schematic plan view of the mechanism shown in FIG. 20.

FIGS. 20 and 21 illustrate a third embodiment in which the cable connection between the electric motor 142 and the unlocking cam 106 is replaced by a direct drive. The pivoting cage 56 is replaced by a modified pivoting cage 180 on which the electric motor 142 is mounted. Its output shaft carries a worm gear 182 which is coupled by pinions 184 and 186 to a gear wheel 188 which is secured directly to the top surface of the unlocking cam 106. Operation of this embodiment is identical with the operation of the embodiment of FIGS. 1 to 15.

In a simplified embodiment of the invention, the unlocking cam 106 is arranged to cause disengagement of the indexing roller 90 which engages in a notch in the cage 56. There is no separate indexing drum 86. This embodiment suffers from the disadvantage that the motor 142 must be capable of exerting sufficient force on the cam 106 to overcome the relatively strong spring 96.

I claim:

1. An exterior rearview mirror for a vehicle comprising
a base member adapted to be secured to a vehicle body,
a mirror head mounted on the base member for angular movement about a substantially vertical axis between a position of normal use and a position folded alongside the vehicle body,
an intermediate member mounted for angular movement about said substantially vertical axis,
detent means adapted to engage with the intermediate member, thereby to hold the mirror head in its normal position,
an electric motor,
transmission means powered by the electric motor and arranged to cause movement of the detent means out of engagement during an initial phase of movement and to cause angular movement of the mirror head away from its normal position during a subsequent phase of movement, and
further detent means adapted to couple the intermediate member to the base member and to disengage when an external force exceeding a predetermined threshold is applied to the mirror head so as to cause angular movement thereof about said substantially vertical axis.

2. An exterior rearview mirror according to claim 1, further comprising spring means (28, 38) acting between the intermediate member (86) and the base member (10) to bias the further detent means (90) into alignment.

3. An exterior rearview mirror according to claim 2, wherein the transmission means includes a cam member (106) having a cam surface (144) adapted to engage with the detent means (102) and an abutment surface (146) adapted to abut against a complementary surface (148) on the mirror head (56, 78, 82) when the cam surface has caused displacement of the detent means (102) out of its engaged position.

4. An exterior rearview mirror according to claim 3, wherein the electric motor (142) is arranged to cause displacement of the cam member (106) in one direction by application of tension to a flexible cable (112).

5. An exterior rearview mirror according to claim 4, wherein a spring (116) is arranged to cause movement of the cam member (106) in an opposite direction.

6. An exterior rearview mirror according to claim 4, wherein a second flexible cable (164) is arranged to cause movement of the cam member (106) in an opposite direction.

7. An exterior rearview mirror according to claim 3, wherein the electric motor (142) is coupled to the cam member (106) by a plurality of gears (182–188).

8. An exterior rearview mirror according to claim 1, wherein the transmission means includes a cam member (106) having a cam surface (144) adapted to engage with the detent means (102) and an abutment surface (146) adapted to abut against a complementary surface (148) on the mirror head (56, 78, 82) when the cam surface has caused displacement of the detent means (102) out of its engaged position.

9. An exterior rearview mirror according to claim 8, wherein the electric motor (142) is arranged to cause displacement of the cam member (106) in one direction by application of tension to a flexible cable (112).

10. An exterior rearview mirror according to claim 9, wherein a spring (116) is arranged to cause movement of the cam member (106) in an opposite direction.

11. An exterior rearview mirror according to claim 9, wherein a second flexible cable (164) is arranged to cause movement of the cam member (106) in an opposite direction.

12. An exterior rearview mirror according to claim 8, wherein the electric motor (142) is coupled to the cam member (106) by a plurality of gears (182–188).

13. An exterior rearview mirror for a vehicle comprising
a base member adapted to be secured to a vehicle body,
a mirror head mounted on the base member for angular movement about a substantially vertical axis between a position of normal use and a position folded alongside the vehicle body,
detent means adapted to hold the mirror head in its normal position,
an electric motor, and
transmission means powered by the electric motor and arranged to cause movement of the detent means out of engagement during an initial phase of movement and to cause angular movement of the mirror head away from its normal position during a subsequent phase of movement;
the transmission means including a cam member having a cam surface adapted to engage with the detent means and an abutment surface adapted to abut against a complementary surface on the mirror head when the cam surface has caused displacement of the detent means out of its engaged position.

14. An exterior rearview mirror according to claim 13, wherein the electric motor (142) is arranged to cause displacement of the cam member (106) in one direction by application of tension to a flexible cable (112).

15. An exterior rearview mirror according to claim 14, wherein a spring (116) is arranged to cause movement of the cam member (106) in an opposite direction.

16. An exterior rearview mirror according to claim 14, wherein a second flexible cable (164) is arranged to cause movement of the cam member (106) in an opposite direction.

17. An exterior rearview mirror according to claim 13, wherein the electric motor (142) is coupled to the cam member (106) by a plurality of gears (182–188).

* * * * *